L. COURT.
WORK HOLDING ATTACHMENT FOR MILLING THREADS.
APPLICATION FILED MAY 28, 1918.
1,343,435.
Patented June 15, 1920.
2 SHEETS—SHEET 1.
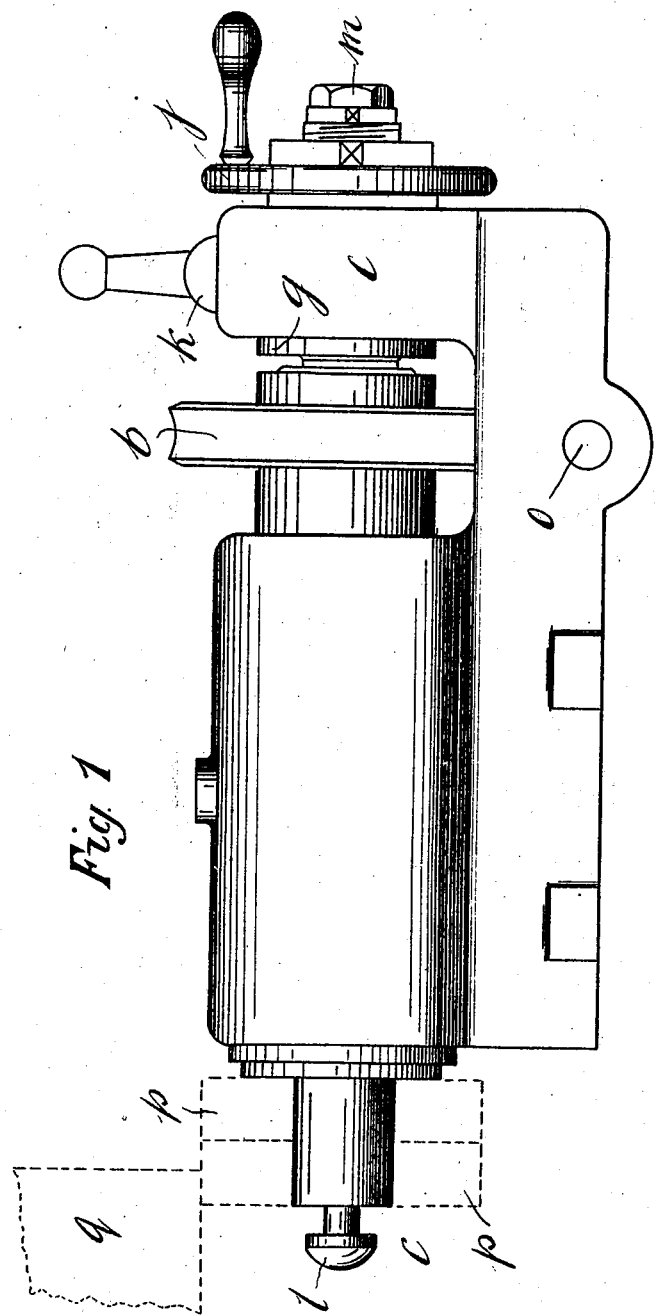
Inventor:-
Leonard Court,
By:- B. Singer, Atty.

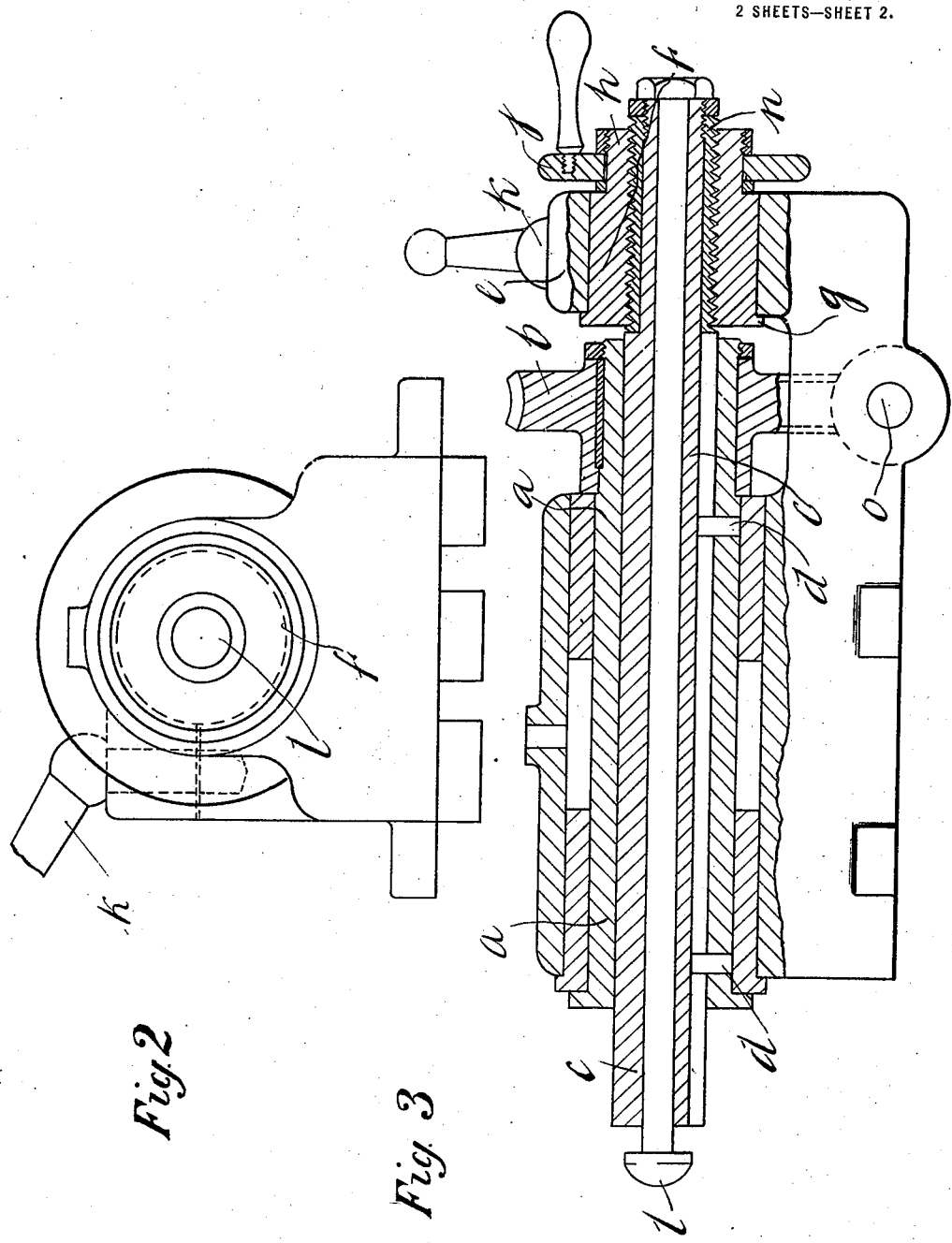

UNITED STATES PATENT OFFICE.

LEONARD COURT, OF BIRMINGHAM, ENGLAND.

WORK-HOLDING ATTACHMENT FOR MILLING THREADS.

1,343,435. Specification of Letters Patent. Patented June 15, 1920.

Application filed May 28, 1918. Serial No. 237,072.

*To all whom it may concern:*

Be it known that I, LEONARD COURT, subject of the King of Great Britain, residing at 35 Gt. Tindal street, Ladywood, Birmingham, England, mechanical and motor engineer, have invented certain new and useful Improvements Relating to Work-Holding Attachments for Milling Threads, of which the following is a specification.

This invention comprises improvements relating to milling machines and has for its object to provide an attachment for such machines for the production of accurate screw threads on bodies with cylindrical or circular contours. A further object of the invention is to relieve the body or lead screw, which governs the feeding forward of the work under the milling cutter, of any bearing strains and to effect the more easy and rapid return of the same after it has advanced to a distance determined by the length of the cutter or the nature of the work operated on.

In the improved attachment of my invention the work carrying device is free to slide with respect to the spindle giving the desired rotary motion for the forward feed of the work, and the copy screw is associated with the work carrying device and provision is made for withdrawing the work carrying device and copy screw without rotating it, thus the main actuating gear is not operated for the return movement.

On the drawing:

Figure 1 is an elevation of the attachment.

Fig. 2 is an end view thereof looking from the left.

Fig. 3 is a longitudinal section.

In the present most usual attachment for milling machines which is mounted in the ordinary traversing table of the machine the spindle carrying the work is provided at the rear end with a worm wheel actuated by a worm and the copy or leader screw at the back end of the spindle is threaded through a back bearing. With this arrangement the copy or leader screw takes the bearing of the spindle and accuracy in the thread cannot long be maintained. Further, to return the spindle and copy after the normal allowance for screwing the work, it is necessary to actuate the worm wheel through the worm, which is very slow and laborious.

In my invention I form the main spindle as a sleeve $a$ or hollow spindle and mount the worm wheel $b$ upon it at the back end and I mount a mandrel or arbor $c$ in this hollow spindle $a$ which mandrel is keyed for example at $d$ so as to rotate with the hollow spindle but is free to slide axially with respect thereto.

In the back bearing $e$ which would ordinarily receive the leader screw I provide a leader nut $f$ which has a plain bearing contour with a collar or flange $g$ at the forward end and a reduced portion $h$ at the rear which passes through the bearing and receives a hand wheel $j$. The bearing $e$ is split and a hand nut $k$ on a stud or pin is adapted to tighten the bearing, so as to clamp the leader nut $f$ and hold it rigid when desired, or free it for rotation when desired. The nut is internally threaded to receive the copy screw or leader screw which corresponds with the thread to be milled on the work.

The sliding mandrel $c$ projects from the hollow spindle $a$ at the front, in any desired manner to receive the work which may be secured by a slotted washer passing on to a headed rod $l$ which passes through the mandrel and is secured by a nut $m$ at the back end.

The rear end of the mandrel $c$ projects through the back bearing and upon it is keyed the leader screw $n$ Fig. 3 so that the latter works through the leader nut $f$ in the bearing $e$.

In operation the rotation of the worm wheel $b$ and hollow spindle $a$ by the actuation of the worm spindle $o$ rotates the mandrel $c$ which is keyed to the hollow spindle $a$ and consequently the leader screw $n$ and this regulates the axial travel of the mandrel $c$ and the work $p$ (dotted lines Fig. 1) as the screw $n$ screws through the leader nut $f$ which is clamped in the bearing $e$. When the screw $n$ has wound itself through the nut to the required working distance so that the screw thread is cut in the work $p$ by the milling cutter $q$ it is necessary to return the screw $n$ to its original position, and to do this the clamping nut $k$ of the back bearing $e$ is turned back to free the leader nut $f$ and the latter is rotated in the bearing $e$ by the hand wheel $j$ or equivalent means which retracts the leader screw $n$ and mandrel $c$ without the necessity of any backward rotation of the worm gear and the hollow spindle $a$, when the clamping screw of the bearing $e$ has been tightened to bind the leader nut *f* again, the operation may be repeated.

It will be understood that I am not limited to the particular construction of the parts given such as the means for driving the spindle or for rotating the leader nut, or clamping the latter to the bearing.

I claim:—

1. A screwing attachment for milling machines comprising in combination a housing, a hollow work spindle, and means for rotating said spindle, a mandrel for supporting the work, said mandrel being disposed within said spindle and arranged so as to rotate therewith but to be slidable with respect thereto, means for rotating said work spindle and means for causing said mandrel to advance when said spindle is rotated said means comprising a copy screw mounted on an extension of said mandrel which passes through a correspondingly screw-threaded nut, a bearing in which said nut is mounted and means to clamp said nut stationary in said bearing so that said mandrel with the copy screw is advanced; means for releasing said nut and means for rotating it to cause a return of said mandrel without rotating it and thus without rotating the spindle.

2. A screwing attachment for milling machines comprising in combination a housing, a hollow work spindle, and means for rotating said spindle, a mandrel for supporting the work, said mandrel being disposed within said spindle and arranged so as to rotate therewith but to be slidable with respect thereto, said means for rotating said work spindle and means for causing said mandrel to advance when said spindle is rotated said means comprising a copy screw mounted on an extension of said mandrel which passes through a correspondingly screw-threaded nut, a split bearing in which said nut is mounted and a clamping screw in said split bearing to clamp the said nut stationary to effect said advance of the mandrel; a hand wheel on said nut so that when said clamping screw is released said nut may be rotated to traverse said mandrel back to initial position without rotating it or said spindle.

3. A screwing attachment for milling machines comprising in combination a housing adapted to be mounted on the machine table, a hollow spindle mounted in said bearing a worm wheel on one end of said spindle and a worm for driving same on a cross shaft in said housing, a bearing forming part of said housing beyond said end of said spindle, and a mandrel within the said spindle and having an extension passing through said bearing, said mandrel being connected to said spindle so as to rotate when said spindle is rotated but being free to move axially with respect thereto during such rotation and when said spindle and said mandrel are not rotating, a rod within said mandrel projecting from the work holding end thereof and an anchoring washer to engage said projecting rod to secure said work on said mandrel; a copy screw mounted on said extension of said mandrel and a nut mounted in said bearing to engage said screw, a split in one side of said bearing and a clamping screw therein; and a hand wheel on an extension of said nut projecting outside said bearing all substantially as described.

In testimony whereof I affix my signature.

LEONARD COURT.